United States Patent [19]

Ebina et al.

[11] Patent Number: 4,975,569
[45] Date of Patent: Dec. 4, 1990

[54] OPTICAL ROTARY ENCODER EMPLOYING PLURAL PHOTOSENSORS DISPOSED IN A SPECIFIC ARRANGEMENT

[75] Inventors: Koyoshi Ebina; Sadaaki Fujii, both of Nara; Zempei Tani, Tondabayashi, all of Japan

[73] Assignee: Sharp Kabushiki Kaisha, Osaka, Japan

[21] Appl. No.: 503,097

[22] Filed: Mar. 30, 1990

Related U.S. Application Data

[63] Continuation of Ser. No. 654,893, Sep. 27, 1984, abandoned.

[30] Foreign Application Priority Data

Oct. 3, 1983 [JP] Japan ................. 58-186413

[51] Int. Cl.$^5$ ............................................. G01D 5/84
[52] U.S. Cl. ........................... 250/231.16; 250/237 G; 341/13
[58] Field of Search .............. 250/225, 231.16, 237 G; 356/395; 341/9, 13

[56] References Cited

U.S. PATENT DOCUMENTS

| | | | |
|---|---|---|---|
| 3,310,798 | 3/1967 | Wingate | 250/231 SE |
| 3,427,463 | 2/1969 | Weyrauch | 250/237 G |
| 4,152,589 | 5/1979 | Mitchell | 250/231 SE |
| 4,184,071 | 1/1980 | Fryer et al. | 250/237 G |
| 4,218,615 | 8/1980 | Zinn | 250/231 SE |
| 4,496,835 | 1/1985 | Boella et al. | 250/231 SE |

Primary Examiner—David C. Nelms
Assistant Examiner—Stephone B. Allen

[57] ABSTRACT

An optical rotary encoder includes four photosensor elements aligned in a square fashion. A first pair of diagonally aligned photosensor elements develop output signals of inverse phase with respect to each other as a slit plate rotates. The thus obtained output signals are applied to a comparator to obtain a first control signal. A second pair of diagonally aligned photosensor elements develop output signals of inverse phase with respect to each other as the slit plate rotates. The output signals from the second pair of photosensor elements are applied to another comparator to obtain a second control signal.

2 Claims, 3 Drawing Sheets

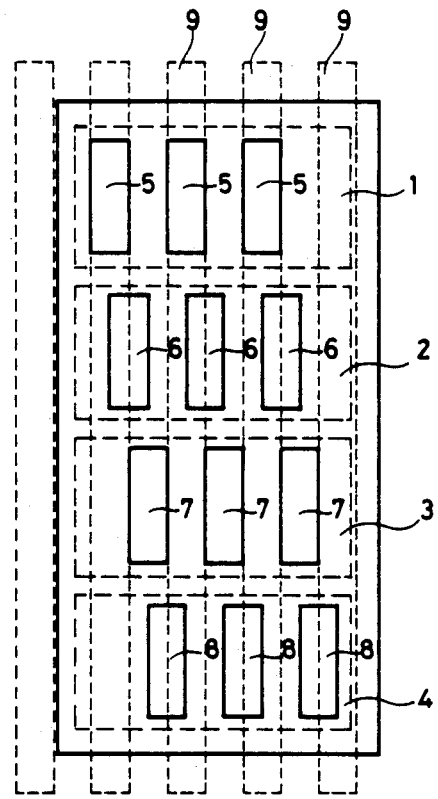
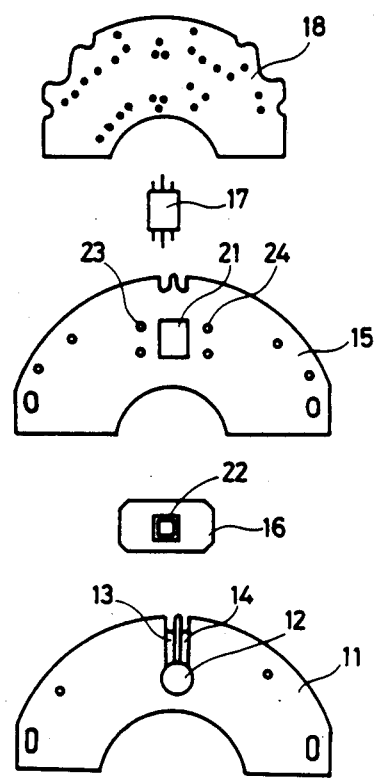
FIG. 1
PRIOR ART
FIG. 2
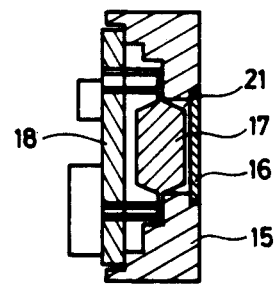
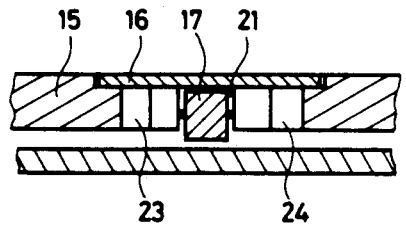
FIG. 3
FIG. 4

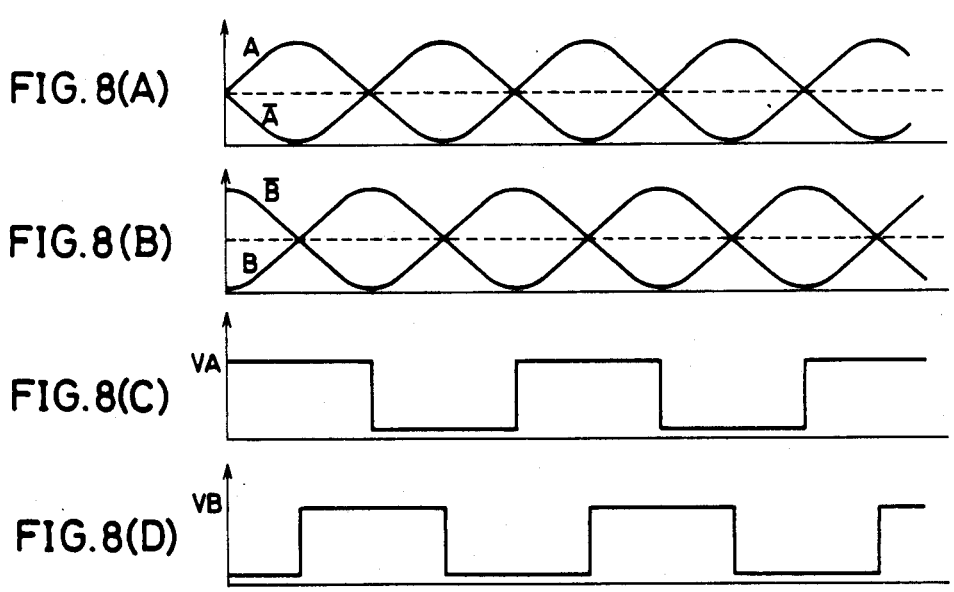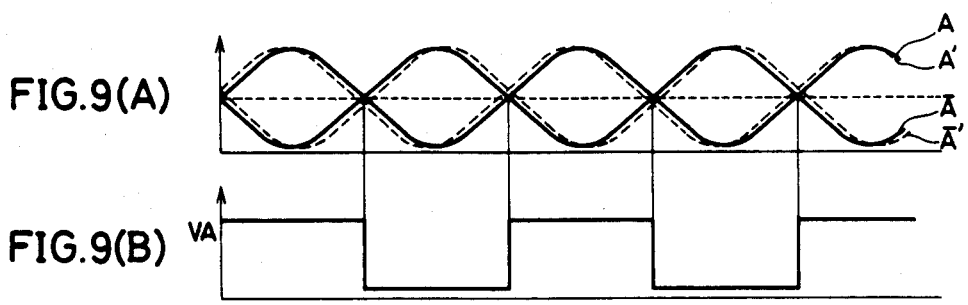

OPTICAL ROTARY ENCODER EMPLOYING PLURAL PHOTOSENSORS DISPOSED IN A SPECIFIC ARRANGEMENT

This application is a continuation of application Ser. No. 06/654,893 filed on Sept. 27, 1984, now abandoned.

BACKGROUND AND SUMMARY OF THE INVENTION

The present invention relates to an optical rotary encoder and, more particularly, to an alignment of photosensor elements and a construction of a circuit connected to the photosensor elements.

An optical rotary encoder generally includes a light source, photosensor elements, and a slit plate disposed between the light source and the photosensor elements. A stationary mask plate is interposed between the photosensor elements and the rotatable slit plate so as to control the optical phase of the beam applied to the photosensor elements through the rotating slit plate and the stationary mask plate. Four photosensor elements are generally required so that each photosensor element develops a signal A of a certain phase, a signal $\overline{A}$ of the inverse phase, a signal B which has a phase difference of 90° with respect to the signal A, and another signal $\overline{B}$ of the inverse phase to the signal B.

If the four photosensor elements are radially aligned, the encoder system becomes large. If the four photosensor elements are aligned along the circular periphery of the slit plate, the adjustment between the mask plate and the photosensor elements becomes complicated. In both cases, the single substrate carrying the four photosensor elements is considerably long and, therefore, the manufacture thereof is not easy.

Accordingly, an object of the present invention is to provide an optical rotary encoder which includes photosensor elements aligned in a desired form which ensures a stable operation of the optical rotary encoder.

Another object of the present invention is to provide a control circuit which receives output signals of the photosensor elements and stably develops a detection output.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, four photosensors are aligned in a square fashion. A stationary mask is disposed in a manner that two photosensors disposed at the diagonal position confront the slits of inverse phase relationship. The output signals developed from the two photosensors disposed at the diagonal position are applied to a comparator in order to obtain a digitized bipolar detection output signal.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a front view showing the relationship between photosensor elements, a stationary mask plate, and a rotatable slit plate in the conventional optical rotary encoder;

FIG. 2 is an exploded view of an essential part of an embodiment of an optical rotary encoder of the present invention;

FIGS. 3 and 4 are sectional views of the essential part of the embodiment of the optical rotary encoder of FIG. 2;

FIGS. 8(A), 8(B), 8(C) and 8(D) are waveform charts showing various signals occurring within the control circuit of FIG. 7; and FIGS. 9(A) and 9(B) are waveform charts for explaining an operational mode of the optical rotary encoder of the present invention.

DESCRIPTION OF THE PREFERRED EMBODIMENTS

Figure 5:
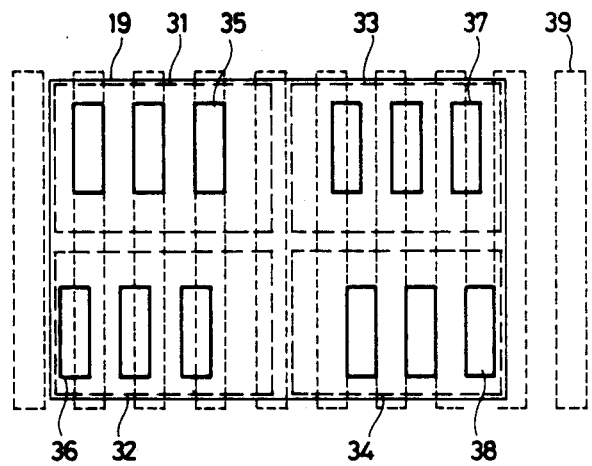
FIG. 5 is a front view showing the relationship between photosensor elements, a stationary mask plate, and a rotatable slit plate in the embodiment of the optical rotary encoder of the present invention.

FIG. 1 schematically shows an essential part of the conventional optical rotary encoder. Four photosensor elements 1, 2, 3 and 4 are radially aligned. A stationary mask plate has slits 5 for developing a signal A, slits 6 for developing a signal B which has the phase difference of 90° with respect to the signal A, slits 7 for developing a signal $\overline{A}$ which has the inverse phase with respect to the signal A, and slits 8 for developing a signal $\overline{B}$ which has the inverse phase with respect to the signal B. A rotatable slit plate has slits 9 which extend over the slits 5, 6, 7 and 8 formed in the stationary mask plate.

The thus aligned photosensor elements make the radius of the slit plate large. Therefore, the conventional system is not suited for minimizing the system size. In the case where the photosensor elements are aligned along the circular periphery of the slit plate, the above-mentioned problem is solved. However, in this case, the alignment adjustment between the photosensor elements, the stationary mask and the rotatable slit plate is difficult because the photosensor elements extend over a long distance. Furthermore, when the photosensor elements are formed on a single chip substrate, there is a great possibility that cracks are formed in the chip because of the considerably long configuration of the chip.

FIG. 2 shows an essential part of an embodiment of an optical rotary encoder of the present invention. A first casing 11 is provided with an opening 12 for accommodating a light emitting diode which functions as a light source. Grooves 13 and 14 are formed in the first casing 11 along which the lead wires of the light emitting diode are secured. A second casing 15 is secured to the first casing 11 in a manner such that a spacing for accommodating a slit plate is provided between the first casing 11 and the second casing 15. A stationary mask plate 16, a photosensor device 17, and a circuit board 18 are fixed to the second casing 15.

Figure 6:
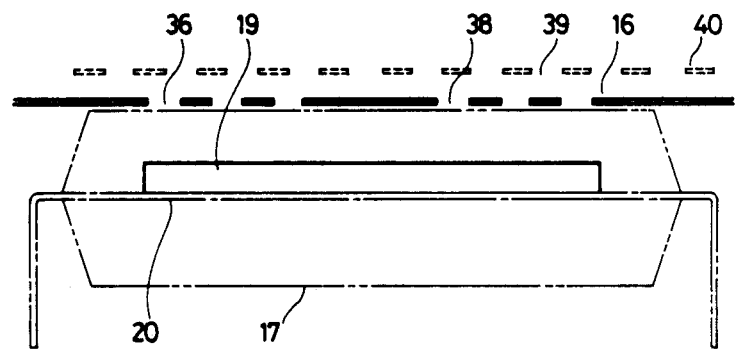
FIG. 6 is a sectional view of the embodiment of the optical rotary encoder of the present invention.

The photosensor device 17 includes a single semiconductor chip 19 connected to lead frames 20 as shown in FIG. 6. The single semiconductor chip 19 is connected to the lead frames 20 through the use of the die bonding technique or the wire bonding technique. The single semiconductor chip 19 is covered by a transparent epoxy resin mold formed by the transfer molding technique. The thus formed photosensor device 17 is disposed in an opening 21 formed in the second casing 15 and is fixed to the second casing 15 with adhesive. The position is adjusted so that the edges of the lead frames 20 are located at preselected positions of the second casing 15. The stationary mask plate 16 is made of a transparent polyester film on which opaque ink is printed at positions except for the slit portions. A rectangular shaped transparent frame 22 is formed in the stationary mask 16 to surround the above-mentioned slit portions. The edges of the lead frames of the photosensor device 17 are positioned at the transparent frame 22, and the stationary mask plate 16 is secured to the second casing 15 with adhesive. The adhesive is painted on the rear surface of the stationary mask plate 16 from the back of the second casing 15 through openings 23 and 24. That is, the adhesive will never leak on the front surface of the stationary mask plate 16. In this way, the photosensor device 17 and the stationary mask plate 16 are secured to the second casing 15.

The photosensor device 17 includes the n-silicon substrate 19, and p-impurity regions diffused on the n-silicon substrate 19 to form square positioned four photosensor elements 31, 32, 33 and 34 (NPN phototransistors) as shown in FIG. 5. Slits 35 formed in the stationary mask plate 16 confront the first photosensor elements 31 to develop the signal A. Slits 36 formed in the stationary mask plate 16 confront the second photosensor element 32 so as to develop the signal B. Slits 37 formed in the stationary mask plate 16 confront the third photosensor element 33 to develop the signal $\overline{B}$. Slits 38 formed in the stationary mask plate 16 confront the fourth photosensor element 34 to develop the signal $\overline{A}$. Slits 39 formed in a rotatable slit plate 40 extend over the slits 35 and 36, or the slits 37 and 38. As the rotatable slit plate 40 rotates, the beam passed through the slits 39 travels through the slits 35, 36, 37 and 38 to reach the photosensor elements 31, 32, 33 and 34. The diagonally positioned photosensor elements 31 and 34 develop inverse signals with respect to each other. The diagonally positioned photosensor elements 32 and 33 develop inverse signals with respect to each other.

Figure 7:
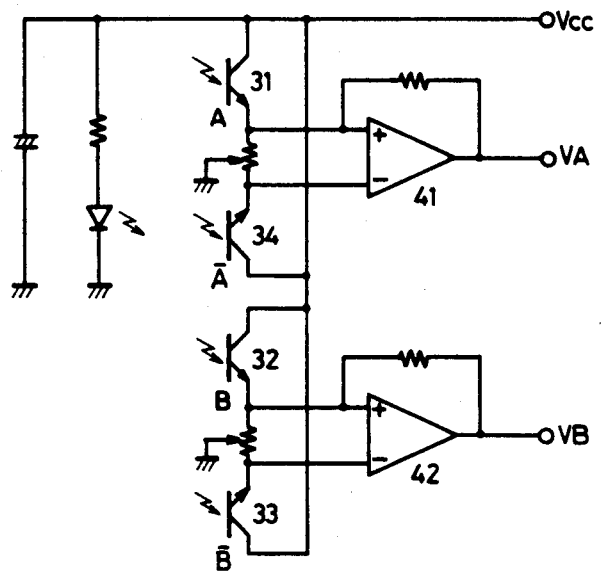
FIG. 7 is a circuit diagram of a control circuit connected to the embodiment of the optical rotary encoder of the present invention.

The four photosensor elements (phototransistors) 31, 32, 33 and 34 are connected to each other in a parallel fashion between the power source Vcc and the grounded terminal as shown in FIG. 7. An output signal A of the first photosensor element 31 is applied to a positive input terminal of a comparator 41. An output signal $\overline{A}$ of the fourth photosensor element 34 is applied to a negative input terminal of the comparator 41. An output signal B of the second photosensor element 32 is applied to a positive input termnal of another comparator 42. An output signal $\overline{B}$ of the third photosensor element 33 is applied to a negative input terminal of the comparator 42. Accordingly, an output signal VA of the comparator 41 and an output signal VB of the comparator 42 have the 90° phase difference with each other as shown in FIGS. 8(C) and 8(D). The output signals VA and VB are digitized signals and, therefore, the following system control can be achieved in a digital manner.

If the stationary mask plate 16 is displaced from the desired position, for example, when the stationary mask plate 16 is rotated around the center thereof in the counterclockwise direction when it is secured to the second casing 15, the phase of the signal A developed from the photosensor element 31 is advanced as shown in FIG. 9(A) (A'). On the other hand, the phase of the output signal $\overline{A}$ is delayed (A'). Accordingly, the two output signals A' and A' have the same level at a point which is identical to the case of the output signals A and $\overline{A}$. That is, the output signal VA of the comparator 41 does not change even when the stationary mask plate 16 is displaced. The same is applied to the output signals B and $\overline{B}$. That is, the output signal VB of the comparator 42 is not influenced by the position of the stationary mask plate 16.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical rotary encoder comprising:
   a light emitting element;
   a photosensor device, formed on a single chip semiconductor substrate, including,
     first and second photosensor elements being positioned vertically adjacent to each other, and
     third and fourth photosensor elements being positioned vertically adjacent to each other,
     said first and third photosensor elements being horizontally adjacent and said second and fourth photosensor elements being horizontally adjacent,
     said first, second, third and fourth photosensor elements thus forming a square,
     said first and fourth photosensor elements being connected in parallel between a power source and a first ground terminal,
     said second and third photosensor elements being connected in parallel between said power source and a second ground terminal;
   a rotatable slit plate disposed between said light emitting element and said photosensor device including a plurality of vertically extending slits each having a length extending over said first and second photosensor elements and said third and fourth photosensor elements;
   a stationary mask plate disposed between said rotatable slit plate and said photosensor device and including,
     a first plurality of slits vertically extending over said first photosensor element,
     a second plurality of slits vertically extending over said second photosensor element,
     a third plurality of slits vertically extending over said third photosensor element, and
     a fourth plurality of slits vertically extending over said fourth photosensor element,
     said second plurality of slits being 90° out of phase with said first plurality of slits with respect to the slits of said rotatable slit plate,
     said third plurality of slits being 180° out of phase with said second plurality of slits,
     said fourth plurality of slits being 180° out of phase with said first plurality of slits; and a control circuit including,
     a first comparator receiving output signals directly from said first and fourth photosensor elements at input terminals, and a second comparator receiving output signals directly from said second and third photosensor elements at input terminals;

wherein position and rate of rotation of said rotatable slit plate may be accurately determined from a first output produced by said first comparator and a second output produced by said second comparator.

2. The optical rotary encoder as claimed in claim 1, wherein said first, second, third, and fourth photosensor elements are phototransistors.

* * * * *

UNITED STATES PATENT AND TRADEMARK OFFICE
CERTIFICATE OF CORRECTION

PATENT NO. : 4,975,569

DATED : December 4, 1990

INVENTOR(S) : Kiyoshi EBINA, et al

It is certified that error appears in the above-identified patent and that said Letters Patent is hereby corrected as shown below:

On the title page, correct the first Inventor's name from

"Koyoshi Ebina" to --Kiyoshi Ebina--.

Signed and Sealed this

Twenty-second Day of September, 1992

Attest:

DOUGLAS B. COMER

*Attesting Officer*  *Acting Commissioner of Patents and Trademarks*